(12) United States Patent
Suehiro

(10) Patent No.: US 11,196,378 B2
(45) Date of Patent: Dec. 7, 2021

(54) MOTOR CONTROL DEVICE

(71) Applicant: DENSO CORPORATION, Kariya (JP)

(72) Inventor: Yukito Suehiro, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/753,087

(22) PCT Filed: Oct. 5, 2018

(86) PCT No.: PCT/JP2018/037415
§ 371 (c)(1),
(2) Date: Apr. 2, 2020

(87) PCT Pub. No.: WO2019/070062
PCT Pub. Date: Apr. 11, 2019

(65) Prior Publication Data
US 2020/0295697 A1 Sep. 17, 2020

(30) Foreign Application Priority Data
Oct. 6, 2017 (JP) .............................. JP2017-196211

(51) Int. Cl.
*H02M 7/5387* (2007.01)
*H02P 27/08* (2006.01)

(52) U.S. Cl.
CPC .................... *H02P 27/085* (2013.01)

(58) Field of Classification Search
CPC .......................... H02P 27/085; H02M 7/53873
See application file for complete search history.

(56) References Cited

U.S. PATENT DOCUMENTS

2007/0145940 A1* 6/2007 Tsubota ............ H02M 7/53873
318/811
2015/0311821 A1 10/2015 Kondo et al.

FOREIGN PATENT DOCUMENTS

JP   2003-79136 A    3/2003
JP   2016-226285 A   12/2016

OTHER PUBLICATIONS

Dec. 18, 2018 International Search Report issued in International Patenet Application No. PCT/JP2018/037415.

* cited by examiner

Primary Examiner — Cortez M Cook
(74) Attorney, Agent, or Firm — Oliff PLC

(57) ABSTRACT

A motor control device generates three-phase drive currents having a phase difference by combining on-off actions of switching elements and supplies the three-phase drive currents to three-phase coils of a brushless motor. The motor control device includes a drive circuit including a bridge circuit that uses multiple switching elements and a control circuit that sets a control pulse, which causes each of the switching elements to perform on-off actions. The control circuit includes a control pulse generating unit that generates a control pulse. The control circuit further includes a set value retaining unit that retains a set value of an on-time length of the control pulse, which is referred to when the control pulse is generated in the control pulse generating unit. The control circuit further includes a set value changing unit that changes the set value retained in the set value retaining unit.

5 Claims, 3 Drawing Sheets

MOTOR CONTROL DEVICE

CROSS-REFERENCE TO RELATED APPLICATION

The present application is based upon Japanese Patent Application No. 2017-196211, filed on Oct. 6, 2017, the contents of which are incorporated herein by reference.

TECHNICAL FIELD

The present disclosure relates to a motor control device that controls power supply to a brushless motor by using a bridge circuit of semiconductor switching elements.

BACKGROUND ART

Patent Document 1 discloses a known motor control device that controls a brushless motor. The motor control device includes a bridge circuit that uses six semiconductor switching elements and generates three-phase drive currents having a phase difference of 120° by combining on-off actions of the respective switching elements. When generating three-phase drive currents, the motor control device performs PWM control on one of two switching elements of each phase, which operate in pair, thereby adjusting the magnitude of the drive current of each phase. The motor control device supplies the thus generated three-phase drive currents to the respective three-phase coils.

PRIOR ART DOCUMENT

Patent Document

Patent Document 1: Japanese Laid-Open Patent Publication No. 2016-226285

SUMMARY OF THE INVENTION

Switching elements that constitute a bridge circuit vary in performance due to individual differences. Thus, even if the same control pulse is input to the respective switching elements, for example, in PWM control, the on-time of the respective switching elements varies, resulting in a significant variation in the three-phase drive currents. In addition to such variation in performance of the switching elements, various factors in generation of three-phase drive currents based on the control pulse can cause variation in the phase currents. It has been discovered that such variation can cause the magnetic flux generated at each phase coil of the motor to deviate from the desired value, and that such deviation may cause problems such as generation of magnetic noises from the motor.

It is an objective of the present disclosure to provide a motor control device capable of eliminating current variation in three-phase drive currents, thereby improving the rotational performance of a brushless motor.

In accordance with one aspect of the present disclosure, a motor control device is provided that generates three-phase drive currents having a phase difference by combining on-off actions of switching elements and supplies the three-phase drive currents to three-phase coils of a brushless motor. The motor control device includes a drive circuit that includes a bridge circuit using switching elements and a control circuit that sets a control pulse, which causes each of the switching elements to perform on-off actions. The control circuit includes a control pulse generating unit that generates the control pulse, a set value retaining unit that retains a set value of an on-time length of the control pulse, which is referred to when the control pulse is generated in the control pulse generating unit, and a set value changing unit that changes the set value retained in the set value retaining unit.

With the above-described configuration, when the control pulse for operating the switching elements is generated by the control pulse generating unit, the set value of the on-time length of the control pulse retained in the set value retaining unit is referred to. At this time, the set value can be changed through the set value changing unit. That is, the on-time length of the control pulse is adjusted through change in the set value, which enables adjustment of the on-time of the switching elements. This eliminates current variation in the three-phase drive currents, which include variation in performance due to the individual differences of the switching elements.

MODES FOR CARRYING OUT THE INVENTION

A motor control device according to an embodiment will now be described.

Figure 1:
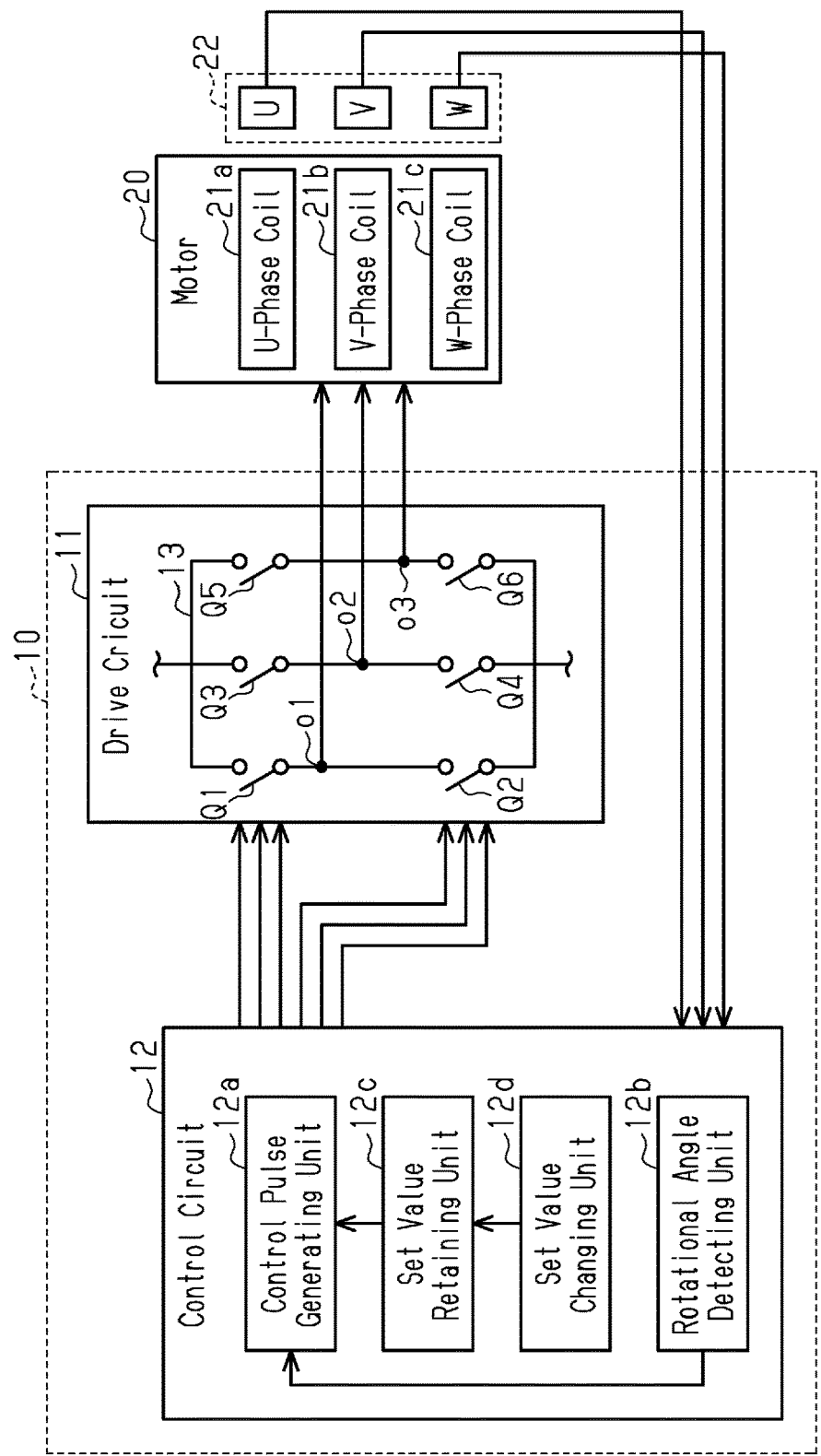
FIG. 1 is a schematic diagram of a motor control device according to an embodiment of the present disclosure.

As shown in FIG. 1, a motor control device 10 controls, for example, a brushless motor (hereinafter, referred to as motor) 20, which is used as a drive source of in-vehicle devices. The motor control device 10 controls power supply to the motor 20 to control rotation. The motor 20 includes three-phase coils: a U-phase coil 21a, a V-phase coil 21b, and a W-phase coil 21c. The motor 20 also includes a detection sensor 22, which detects the rotational angle of a rotor (not shown).

The motor control device 10 includes a drive circuit 11 and a control circuit 12. The drive circuit 11 includes a bridge circuit (full-bridge circuit) 13, which uses six semiconductor switching elements (for example, MOSFETs), or first to sixth switching elements Q1 to Q6. The first, third, and fifth switching elements Q1, Q3, Q5 are located on the upper arms of the U-phase, the V-phase, and the W-phase of the bridge circuit 13, respectively. The second, fourth, and sixth switching elements Q2, Q4, Q6 are located on the lower arms of the U-phase, the V-phase, and the W-phase of the bridge circuit 13, respectively. The bridge circuit 13 generates three-phase drive currents (U-phase, V-phase, and W-phase drive currents), which have a phase difference of 120°, by combining on-off actions of the first to sixth switching elements Q1 to Q6. In this case, the U-phase drive current is output to the U-phase coil 21a from an output terminal of between the first and second switching elements Q1, Q2. The V-phase drive current is output to the V-phase coil 21b from an output terminal o2 between the third and fourth switching elements Q3, Q4. The W-phase drive current is output to the W-phase coil 21c from an output terminal o3 between the fifth and sixth switching elements Q5, Q6.

Pulse width modulation control (PWM control) is performed on the first to sixth switching elements Q1 to Q6 during the on-period. Further, the first to sixth switching elements Q1 to Q6 operate in pairs for the respective phases when generating three-phase drive currents. The object of the PWM control is set to one of each pair and changed successively. The magnitude of the three-phase drive currents supplied to the three-phase coils (the phase coils 21a to 21c) of the motor 20 is adjusted by performing PWM control on the first to sixth switching elements Q1 to Q6. The on-ff actions of the first to sixth switching elements Q1 to Q6 (including PWM switching actions) are performed based on control pulsed from the control circuit 12 that are input to the own control terminals (gate terminals).

The control circuit 12 includes a control pulse generating unit 12a, a rotational angle detecting unit 12b, a set value retaining unit 12c, and a set value changing unit 12d.

The control pulse generating unit 12a generates control pulse output to each of the first to sixth switching elements Q1 to Q6 of the drive circuit 11 (the bridge circuit 13). The control pulse includes an enable signal and a PWM signal. The enable signal sets the on-period (off-period) of each of the switching elements Q1 to Q6, which operate in pairs when generating three-phase drive currents. The PWM signal is set to the duty cycle (the ratio of the on-time to the period) at each moment in order to perform the PWM control on the switching elements Q1 to Q6 during the on-period.

The rotational angle detecting unit 12b detects (recognizes) the rotational angle of the rotor of the motor 20 based on an output signal from the detection sensor 22, which corresponds to the rotational angle of the motor 20. The set value retaining unit 12c retains the length of the on-time of the PWM signal in the control pulse. The set value changing unit 12d changes (corrects) the set value based on an input from the outside. If the set value retaining unit 12c does not change the set value, the set value retaining unit 12c retains the initial value as the set value. If an operator who changes settings operates the control circuit 12 to acquire a correction value, the set value changing unit 12d replaces the set value with the correction value, so that the set value retaining unit 12c retains the correction value as a new set value.

The behavior (operation) of the motor control device 10 of the present embodiment will now be described.

The control pulse generating unit 12a of the control circuit 12 sets the control pulse (the enable signal and the PWM signal) at each moment that corresponds to each of the first to sixth switching elements Q1 to Q6 by using the rotational angle information of the motor 20, which is detected by the rotational angle detecting unit 12b, and the set value information related to the control pulse retained in the set value retaining unit 12c, and based on the output current command value of the three-phase drive currents at each moment.

The bridge circuit 13 of the drive circuit 11 generates three-phase drive currents having a phase difference of 120° by combining on-off actions of the switching elements Q1 to Q6 based on the control pulse set by the control circuit 12. The magnitude of the three-phase drive currents is adjusted at each moment through the PWM switching action of the switching elements Q1 to Q6 based on the PWM signal of the control pulse.

The three-phase drive currents, which are generated by the motor control device 10 in the above-described manner, are supplied to the three-phase coils (the respective phase coils 21a to 21c) of the motor 20, so that the motor 20 is driven to rotate by receiving the three-phase drive currents.

The motor control device 10 of the present embodiment is configured to adjust (correct) variation in each phase current that can be caused by various factors in generation of the three-phase drive currents, such as variation in performance due to individual differences of the switching elements Q1 to Q6, which constitute the bridge circuit 13.

Figure 2:
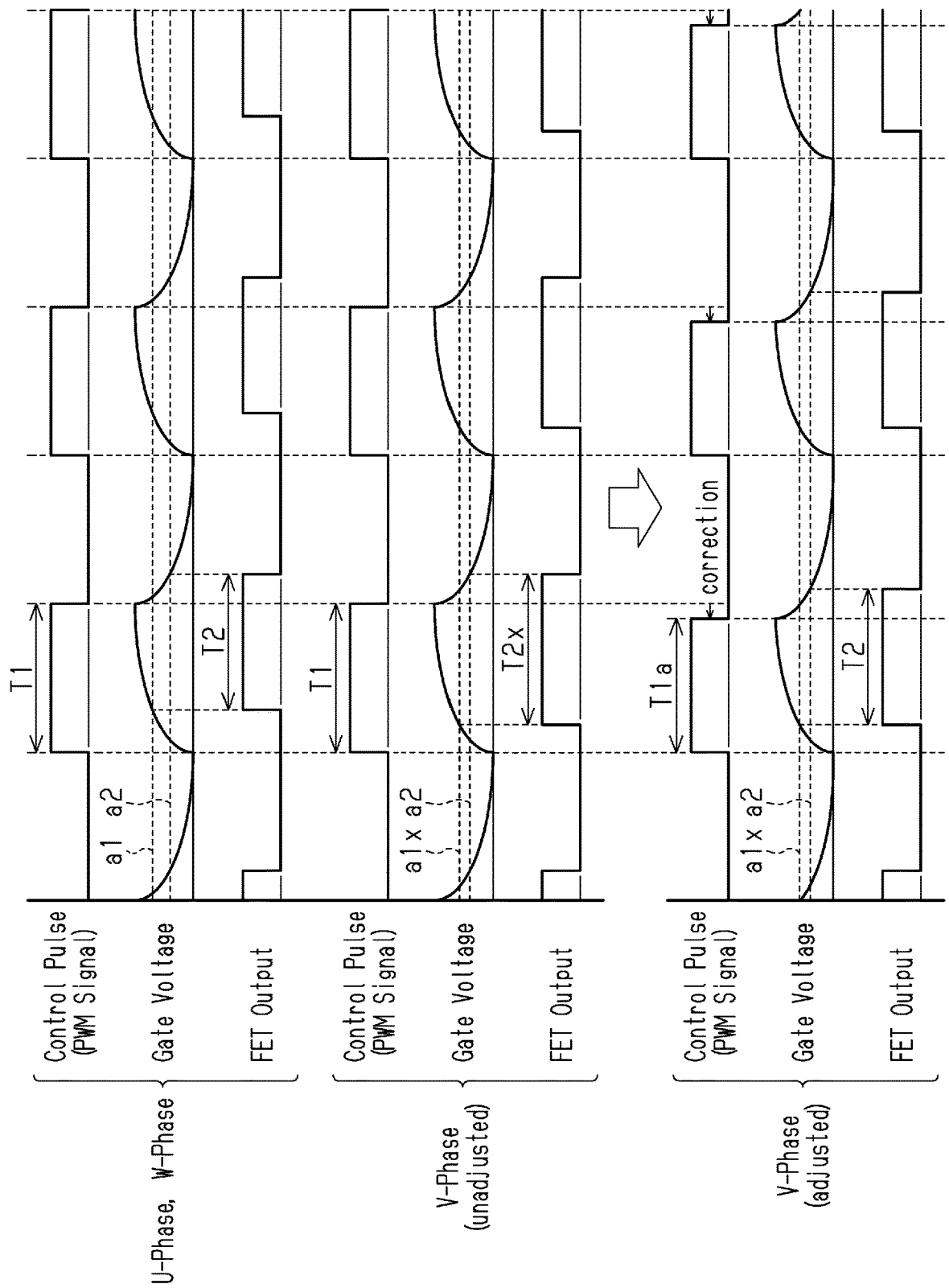
FIG. 2 is a waveform chart illustrating operation of the switching elements of FIG. 1.

FIG. 2 illustrates one example of the adjustment (correction). The control terminal voltage (gate voltage in FIG. 2) of the switching elements Q1 to Q6 is generated in the drive circuit 11 based on the control pulse. Based on the control terminal voltage, the switching elements Q1 to Q6 perform on-off actions (FET output in FIG. 2). In this example, the on-off timings of the switching elements Q1, Q2 of the U-phase and the switching elements Q5, Q6 of the W-phase are normal, and the on timing of the third switching element Q3 of the upper arm in the switching elements Q3, Q4 of the V-phase is early (the off timing is normal). In FIG. 2, the PWM signal of the control pulse is shown, while the enable signal is omitted.

The control terminal voltage (the gate voltage) of each of the switching elements Q1 to Q6 gradually increases in response to the rising edge of the control pulse, and gradually decreases in response to the falling edge of the control pulse. The on threshold and the off threshold of each of the switching elements Q1, Q2, Q5, Q6 of the U-phase and the W-phase, which are turned on and off normally in correspondence with the control terminal voltage (the gate voltage) are a1 and a2, respectively. In contrast, the on threshold of the third switching element Q3, of which the on timing is early, is a1x, which is slightly lower. The off threshold of the third switching element Q3 is a2. Although not illustrated, the on threshold and the off threshold of the fourth switching element Q4 of the V-phase are a1 and a2, respectively.

The on time of the switching elements Q1, Q2, Q5, Q6 of the U-phase and the W-phase is T2, which corresponds to the on time T1 of the control pulse. In contrast, if variation in performance of the third switching element Q3 of the V-phase is not adjusted, the on time of the third switching element Q3 of the V-phase is T2x, which is longer than the on time T2. Accordingly, since the on time T1 of the control pulse in FIG. 2 reflects the duty cycle set by the control circuit 12 (the control pulse generating unit 12a), the longer on time T2x virtually corresponds to an increased duty cycle, so that the V-phase drive current becomes greater than the U-phase and W-phase drive currents.

Figure 3:
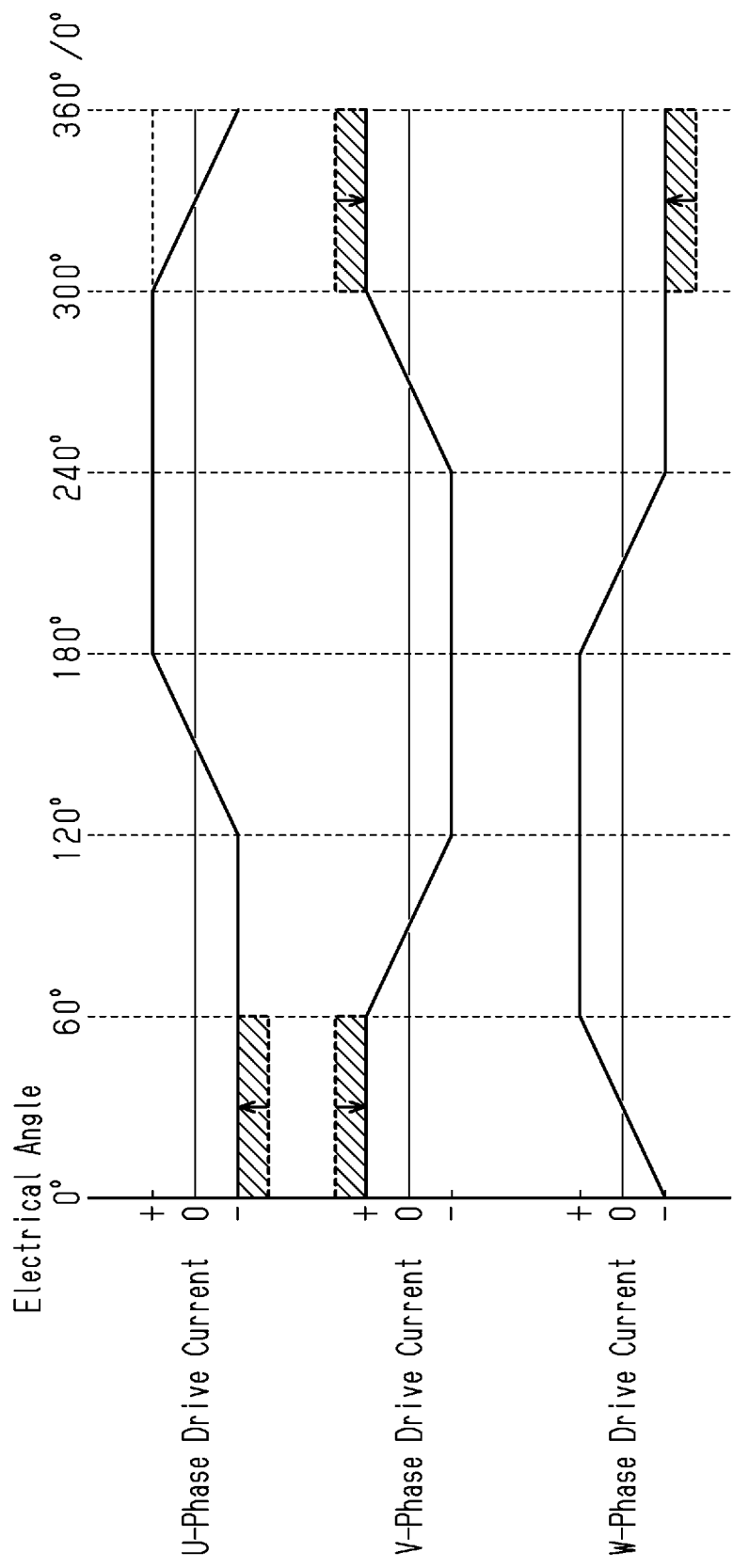
FIG. 3 is a waveform chart of three-phase drive currents generated through operation of the switching elements of FIG. 1.

That is, as indicated by the broken lines of the waveforms of the three-phase drive currents in FIG. 3, the positive side of the V-phase drive current is raised in some regions, while the negative side of the U-phase drive current and the W-phase drive current is lowered in some regions. Thus, if no measures were taken, the magnetic flux generated at each of the phase coils 21a to 21c of the motor 20 would deviate from a desired value, and such deviation may cause problems such as generation of magnetic noises from the motor 20.

In view of the above, the motor control device 10 of the present embodiment is capable of adjusting variation in the phase currents due to variation in performance of the third switching element Q3 of the V-phase through the set value changing unit 12d in the control circuit 12.

The set value changing unit 12d replaces the set value retained in the set value retaining unit 12c with a new set value (correction value) that shortens the on time of the control pulse to T1a, so that the on time T2x of the third switching element Q3 of the V-phase before being adjusted becomes T2, which is the same as that of the other phases, as indicated by the waveform of the V-phase after being adjusted in FIG. 2. The set value retaining unit 12c retains the new set value. In the present embodiment, the rising edge of the control pulse is fixed, and only the falling edge is changed to adjust the length of the on time. Accordingly, based on the control pulse that has been adjusted (corrected) to the slightly shorter on time T1a, the on time of the third switching element Q3 of the V-phase is adjusted to T2, which is the same as that of the other phases, by using the control terminal voltage (gate voltage) and the set of the on threshold ax1 and the off threshold a2.

That is, the parts of the waveforms of the three-phase drive currents indicated by the broken lines in FIG. 3 are adjusted to match the solid lines, so as to eliminate the variation in each phase current. As a result, the magnetic flux generated at each of the phase coils 21a to 21c of the motor 20 matches the desired value. This suppresses the occurrence of problems such as generation of magnetic noises from the motor 20.

The above-described embodiment is an example in which the on time of the third switching element Q3 of the V-phase is longer than the others. However, the same measure is taken in a case in which an individual difference causes the on time of any of the switching elements Q1 to Q6 to be longer or shorter than the desired time length. That is, the on time of each of the switching elements Q1 to Q6 before being adjusted is measured. If the variation in each phase current is within a permitted value, the set value retaining unit 12c maintains the retained value. If the variation exceeds the permitted value, the set value changing unit 12d rewrites the set value in the set value retaining unit 12c to a set value within the permitted value.

The present embodiment has the following advantages.

(1) When a control pulse is generated in the control pulse generating unit 12a, the set value of the on-time length of the control pulse retained in the set value retaining unit 12c is referred to. At this time, the set value can be changed through the set value changing unit 12d in the present embodiment. That is, the on-time length of the control pulse is adjusted through change in the set value, which enables adjustment of the on-time of the switching elements Q1 to Q6. This eliminates current variation in the three-phase drive currents, which include variation in performance due to the individual differences of the switching elements Q1 to Q6. As a result, the magnetic flux generated at each of the phase coils 21a to 21c of the motor 20 has a desired value. This improves the rotational performance of the motor 20. For example, the generation of magnetic noises from the motor 20 is suppressed.

(2) The on-time length of the PWM signal of the control pulse is adjusted through the set value changing unit 12d to adjust the magnitude of the drive current based on the PWM switching actions of the switching elements Q1 to Q6. The present embodiment thus eliminates current variation in three-phase drive currents in a favorable manner.

(3) The set value changing unit 12d fixes the rising edge of the control pulse at the set value and changes the falling edge. That is, the set value changing unit 12d simply needs to change only one of the rising edge and the falling edge to cope with the situation.

The above described embodiment may be modified as follows.

In the above-described embodiment, the set value changing unit 12d is configured to fix the rising edge of the control pulse at the set value and changes the falling edge. However, the set value changing unit 12d may be configured to change the rising edge and fix the falling edge. Further, the set value changing unit 12d may change both of the rising edge and the falling edge.

In the above-described embodiment, the on-time length of the PWM signal of the control pulse is adjusted through the set value changing unit 12d. However, the present disclosure may be employed for an enable signal that sets a wider on-period than a PWM switching action.

In the above-described embodiment, the set value changing unit 12d is configured to change the set value based on an operation by an operator. However, the set value changing unit 12d may be configured to automatically change the set value without operator intervention.

In the above-described embodiment, the bridge circuit 13 is constituted by a bridge circuit using the six switching elements Q1 to Q6. However, the number of switching elements is not limited to this but may be changed as necessary. Alternatively, the bridge circuit 13 may be constituted by a half-bridge circuit.

The invention claimed is:

1. A motor control device that generates three-phase drive currents having a phase difference by combining on-off actions of switching elements and that supplies the three-phase drive currents to three-phase coils of a brushless motor, the motor control device comprising:
a drive circuit that includes a bridge circuit using switching elements; and
a control circuit that sets a control pulse, which causes each of the switching elements to perform on-off actions, wherein
the control circuit includes
a control pulse generating unit that generates the control pulse,
a set value retaining unit that retains a set value of an on-time length of the control pulse, which is referred to when the control pulse is generated in the control pulse generating unit, and
a set value changing unit that changes the set value retained in the set value retaining unit, and wherein
when a variation in the three-phase drive currents is generated, the set value changing unit is configured to replace the set value of the on-time length of the control pulse set to a said switching element for a phase of the three phases in which the variation in the three-phase drive currents is generated so that the on-time length of the said switching element for the phase in which the variation in the three-phase drive currents is generated becomes the same as on-time lengths of the switching elements for other phases of the three phases.

2. The motor control device according to claim 1, wherein the control pulse includes a PWM signal that performs a PWM control during an on-period of each of the switching elements, and
the set value changing unit changes setting of an on-time of the PWM signal.

3. The motor control device according to claim 1, wherein the set value changing unit fixes a rising edge of the control pulse at the set value and changes a falling edge.

4. The motor control device according to claim 1, wherein the motor control device is configured to limit variation in the on-time length of the switching elements when the variation in the three-phase drive currents is generated even if the same control pulse is input to respective switching elements.

5. The motor control device according to claim 1, wherein the set value retaining unit is configured to:

maintain the set value of the on-time length of the control pulse retained in the set value retaining unit if the variation in the three-phase drive currents is within a permitted value; and rewrite the set value of the on-time length of the control pulse retained in the set value retaining unit to a set value that allows for the variation in the three-phase drive currents to be within the permitted value if the variation in the three-phase drive currents exceeds the permitted value.

* * * * *